US012031510B2

(12) United States Patent
Zhao et al.

(10) Patent No.: US 12,031,510 B2
(45) Date of Patent: Jul. 9, 2024

(54) METHODS AND SYSTEMS FOR INHIBITING AUTOMATIC ENGINE SHUTDOWN

(71) Applicant: Ford Global Technologies, LLC, Dearborn, MI (US)

(72) Inventors: Yanan Zhao, Ann Arbor, MI (US); Jason Meyer, Canton, MI (US); James Reynolds, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/650,629

(22) Filed: Feb. 10, 2022

(65) Prior Publication Data

US 2023/0250784 A1 Aug. 10, 2023

(51) Int. Cl.
*F02N 11/08* (2006.01)

(52) U.S. Cl.
CPC .. *F02N 11/0803* (2013.01); *F02N 2200/0801* (2013.01); *F02N 2200/102* (2013.01); *F02N 2200/123* (2013.01); *F02N 2200/124* (2013.01); *F02N 2200/125* (2013.01)

(58) Field of Classification Search
CPC .. F02N 11/08; F02N 11/0803; F02N 11/0811; F02N 2200/0801; F02N 2200/102; F02N 2200/123; F02N 2200/124; F02N 2200/125; F02D 31/00; F02D 31/002; F02D 31/007; F02D 41/067; G07C 5/02
USPC ............... 701/110–115; 123/198 D, 198 DB, 123/198 DC, 198 F
See application file for complete search history.

(56) References Cited

U.S. PATENT DOCUMENTS

| | | | | |
|---|---|---|---|---|
| 6,941,218 B2 * | 9/2005 | Wolf | F02N 11/0822 | 701/115 |
| 9,205,827 B2 | 12/2015 | Yamaguchi et al. | | |
| 9,475,479 B2 | 10/2016 | Hancasky et al. | | |
| 10,933,752 B2 | 3/2021 | Miller et al. | | |
| 2012/0132176 A1 * | 5/2012 | Sawada | F02N 11/0837 | 123/339.14 |
| 2012/0290179 A1 * | 11/2012 | Oishi | B60W 30/192 | 701/54 |
| 2012/0303194 A1 | 11/2012 | Muta | | |
| 2014/0100727 A1 * | 4/2014 | Pietron | B60W 10/08 | 477/3 |
| 2015/0298678 A1 * | 10/2015 | Yu | B60W 30/18172 | 903/903 |
| 2017/0080923 A1 * | 3/2017 | Johri | B60W 10/06 | |
| 2018/0297475 A1 * | 10/2018 | Zhao | B60T 8/172 | |
| 2018/0334038 A1 * | 11/2018 | Zhao | B60W 30/16 | |
| 2019/0368458 A1 * | 12/2019 | Chen | B60W 20/40 | |
| 2020/0240381 A1 * | 7/2020 | Awadi | F02N 11/0822 | |
| 2021/0188125 A1 * | 6/2021 | Zhao | B60L 50/64 | |
| 2022/0034288 A1 * | 2/2022 | Rollinger | F02N 11/0833 | |

* cited by examiner

*Primary Examiner* — Hai H Huynh
*Assistant Examiner* — Johnny H Hoang
(74) *Attorney, Agent, or Firm* — David Kelley; McCoy Russell LLP

(57) ABSTRACT

Systems and methods for improving operation of a vehicle are presented. In one example, a controller may respond to a presence or absence of a prediction of an increase in vehicle speed during a look ahead window. The controller may inhibit or allow automatic engine stopping in response to the presence or absence of the prediction of the increase in vehicle speed during the look ahead window.

18 Claims, 7 Drawing Sheets

METHODS AND SYSTEMS FOR INHIBITING AUTOMATIC ENGINE SHUTDOWN

FIELD

The present description relates to a system and methods for improving automatic engine stopping and starting for a vehicle. The methods may be particularly useful for engines that may be automatically stopped while a vehicle is moving.

BACKGROUND AND SUMMARY

An engine of a vehicle may be automatically stopped to conserve fuel. Earlier examples of stop/start vehicles may automatically stop an engine when vehicle speed is zero. More recently, it has been realized that additional amounts of fuel may be conserved if a vehicle's engine is stopped while a vehicle is moving. Vehicles having engines that may be automatically stopped when a vehicle is moving may be referred to as rolling stop/start (RSS) vehicles. However, RSS vehicles may suffer from drivability issues. Therefore, it may be desirable to improve upon RSS vehicles.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
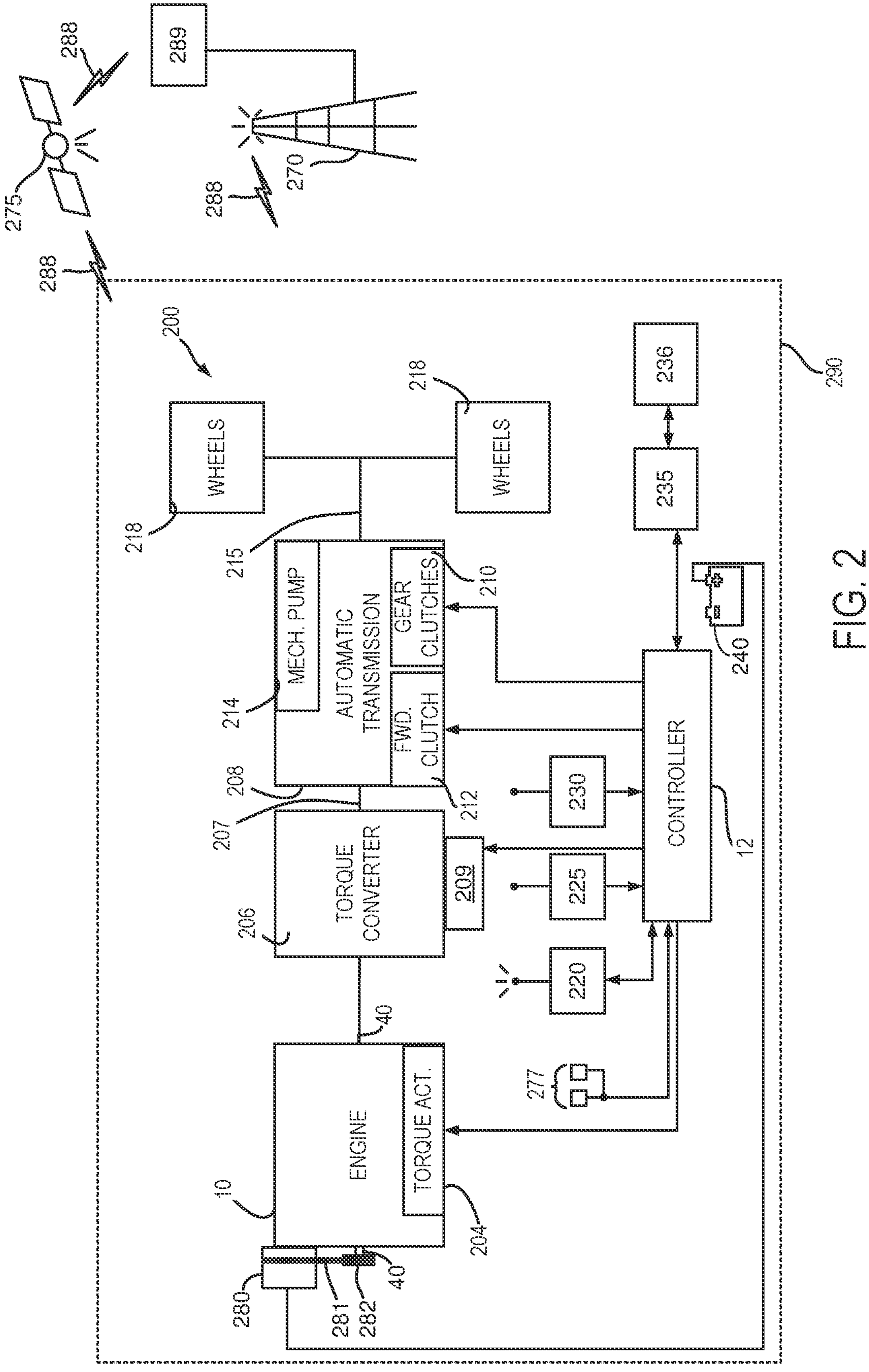
FIG. 2 shows an example vehicle driveline.
Figure 3:
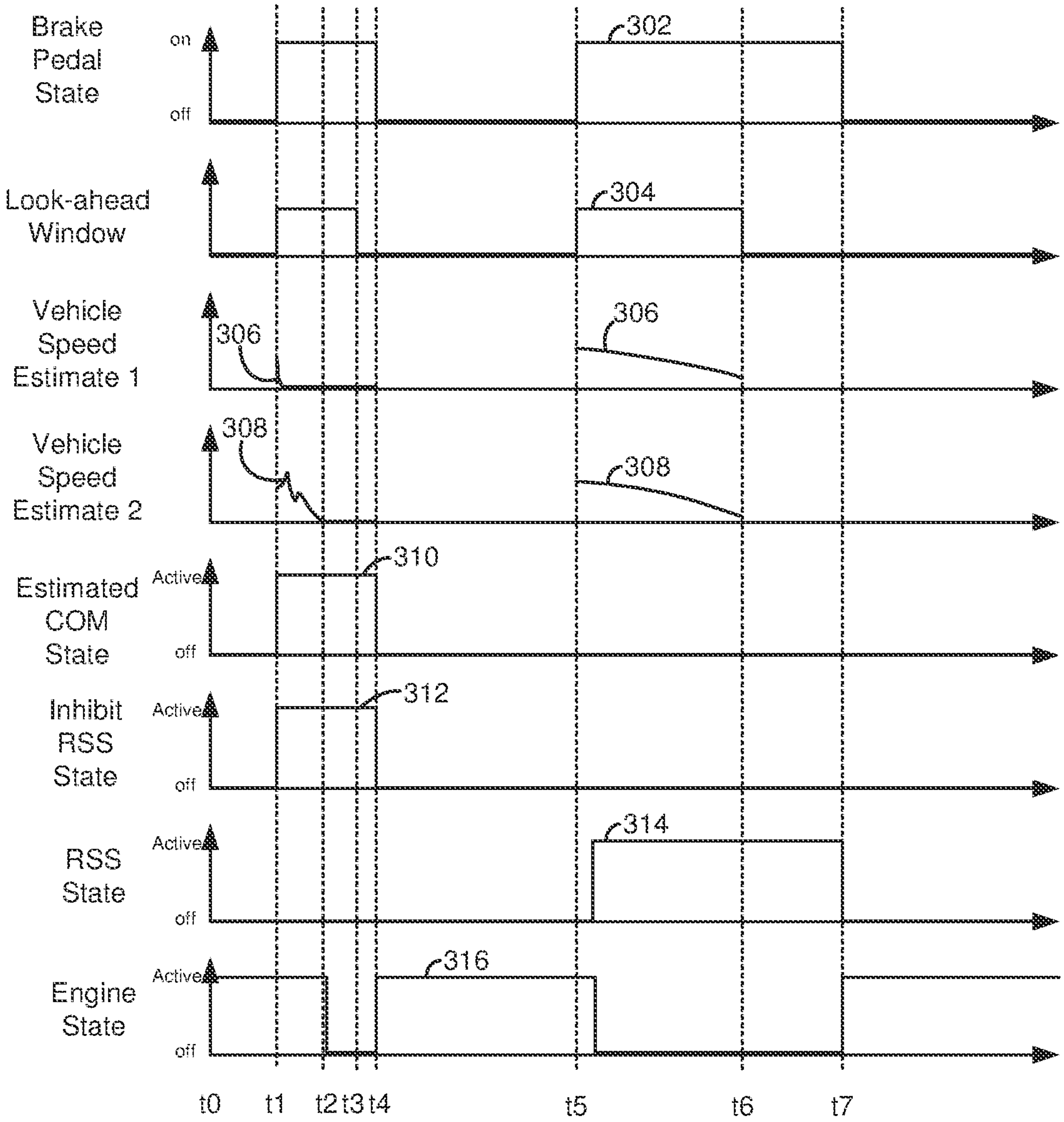
FIG. 3 shows an example prophetic engine operating sequence according to the method of FIGS. 4 and 5.
Figure 6B:
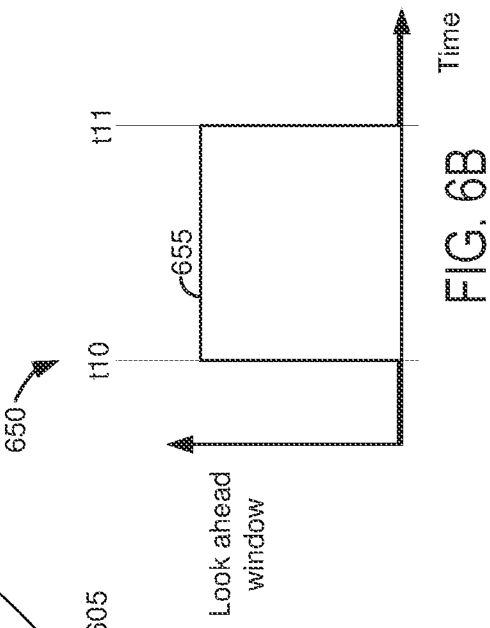
FIGS. 6A and 6B illustrate example look ahead windows and vehicle travel path.
Figure 6A:
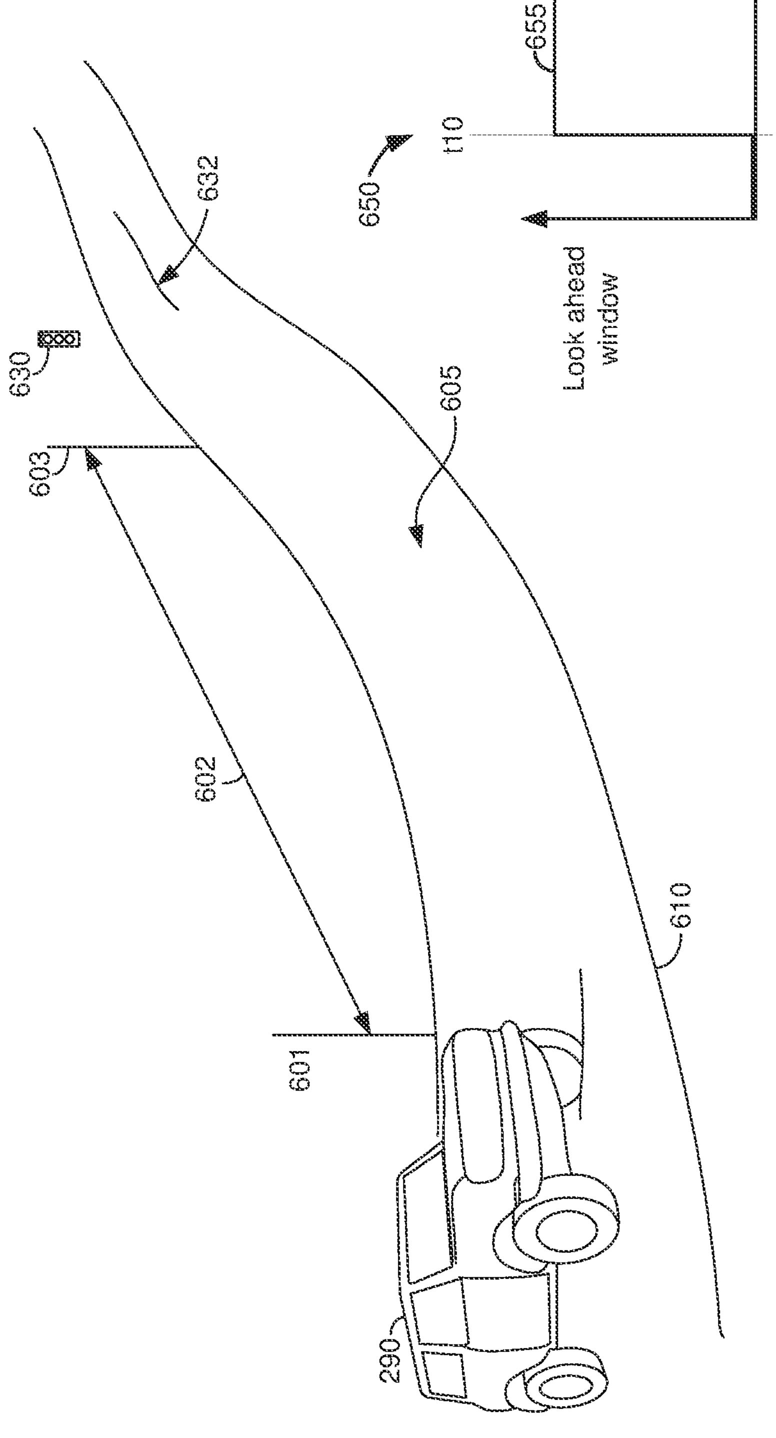
Figure 7:
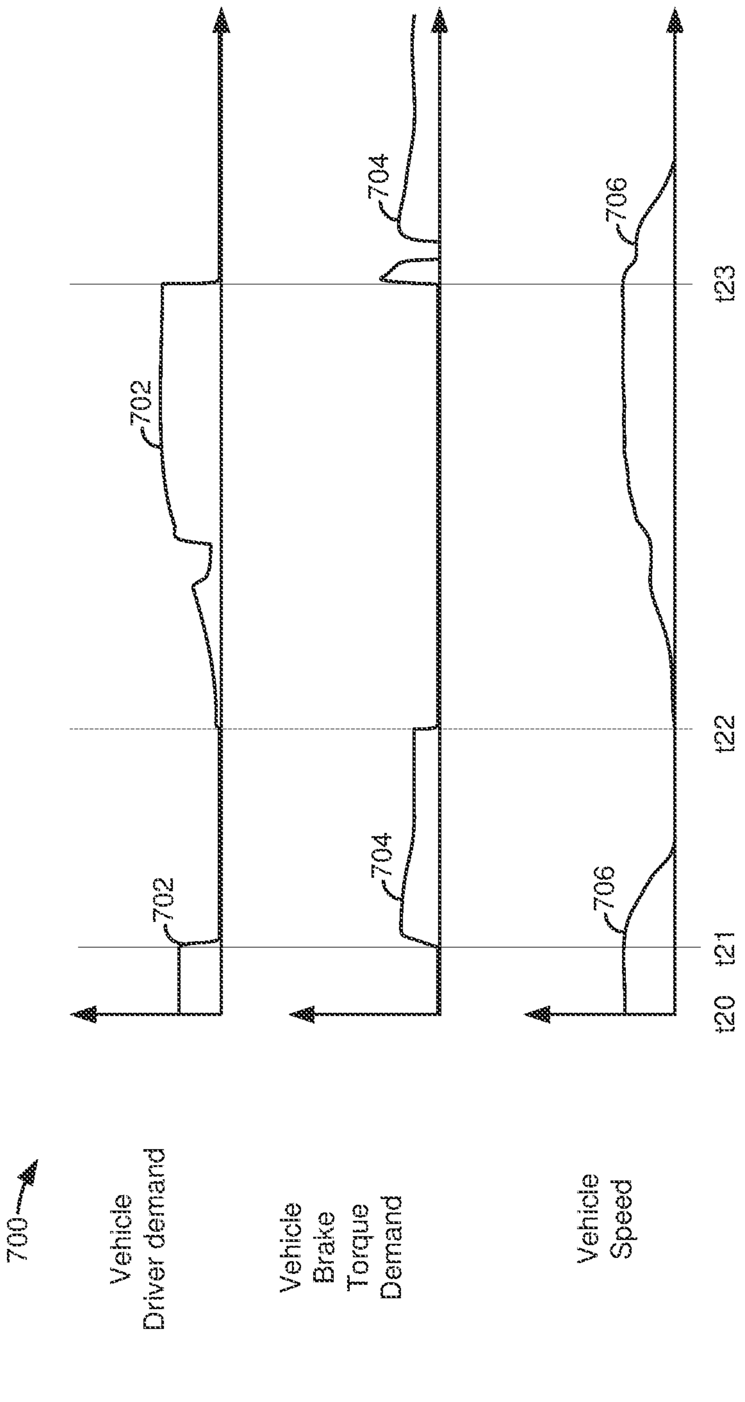
FIG. 7 shows an example vehicle drive history.

The present description is related to controlling engine operation of a vehicle. The vehicle may include an engine that may be automatically stopped while the vehicle is moving. Automatically stopping the engine while the vehicle is moving may yield increased vehicle fuel economy, and predicting if one or more conditions may occur during an engine shutdown may improve vehicle drivability. The vehicle may include an engine of the type shown in FIG. 1. The engine may be included in a driveline or powertrain as shown in FIG. 2. The engine and vehicle may operate according to the method of FIGS. 4 and 5 as shown in the sequence of FIG. 3. Conditions that may be indicative of an operator change of mind may be determined for a vehicle travel path and look ahead window as shown in FIGS. 6A and 6B. The conditions that may be indicative of the operator change of mind may also be determined according to a vehicle drive history as shown in FIG. 7.

A vehicle may include an engine that may be automatically stopped while the vehicle is moving. Stopping the engine while the vehicle is moving may allow the engine to remain stopped for a longer amount of time so that a larger amount of fuel may be conserved. The engine may be stopped when driver demand is low and the brake pedal is applied so that a reduction of engine torque may go unnoticed. However, the vehicle's driver may release the brake pedal and/or request additional torque output from the engine between a time when stopping the engine is requested and a time when the vehicle completely stops. The brake pedal release and/or the increasing driver demand torque request may be indicative of a driver's change of mind to stop the vehicle. If conditions that may be indicative of a driver's change of mind are present, the engine may be restarted. Yet, stopping and restarting the engine while the vehicle is moving may result in driveline torque disturbances that may be noticeable and objectionable to vehicle occupants. In particular, driveline torque oscillations may be introduced during an engine shutdown when a torque converter clutch is opened. In addition, driveline torque disturbances may be introduced via compressing and relieving torque on belt tensioners that couple a belt integrated starter/generator to the engine during engine starting. Therefore, it may be desirable to avoid shutting down an engine when the vehicle's driver will take actions that may cause the engine to be automatically started before the vehicle speed reaches zero. In addition, it may be desirable to avoid shutting down the engine when other conditions may cause the engine to be automatically started before the vehicle speed reaches zero.

The inventors herein have recognized that further improvements may be made to automatic stop/start vehicles and have developed a method for operating an engine, comprising: inhibiting automatic engine stopping via a controller according to a prediction that conditions indicative of an operator change of mind condition are expected within a look ahead window.

By inhibiting automatic engine stopping according to predicted conditions that may be indicative of an operator change of mind condition taking place during a look a look ahead window, it may be possible to provide the technical result of reducing a possibility of conditions where vehicle drivability may degrade. For example, if a first vehicle is slowing and vehicles ahead of the first vehicle are beginning to move to a higher speed, it may be predicted based on the speeds of the vehicles ahead of the first vehicle that the speed of the first vehicle will increase due to the vehicle's driver demanding additional torque. During such conditions, automatic engine stopping in the first vehicle may be inhibited to reduce a possibility of driveline torque disturbances in the first vehicle.

The present description may provide several advantages. Specifically, the approach may reduce driveline torque disturbances in a driveline. In addition, the approach may provide a balance between vehicle fuel economy and vehicle drivability. Further, the approach may improve prediction of conditions that may indicative of an operator change of mind that leads to an engine restart.

The above advantages and other advantages, and features of the present description will be readily apparent from the following Detailed Description when taken alone or in connection with the accompanying drawings. The term "driver" may be referred to throughout this specification and it refers to a human driver or human vehicle operator that is the authorized operator of the vehicle unless otherwise indicated.

Figure 1:
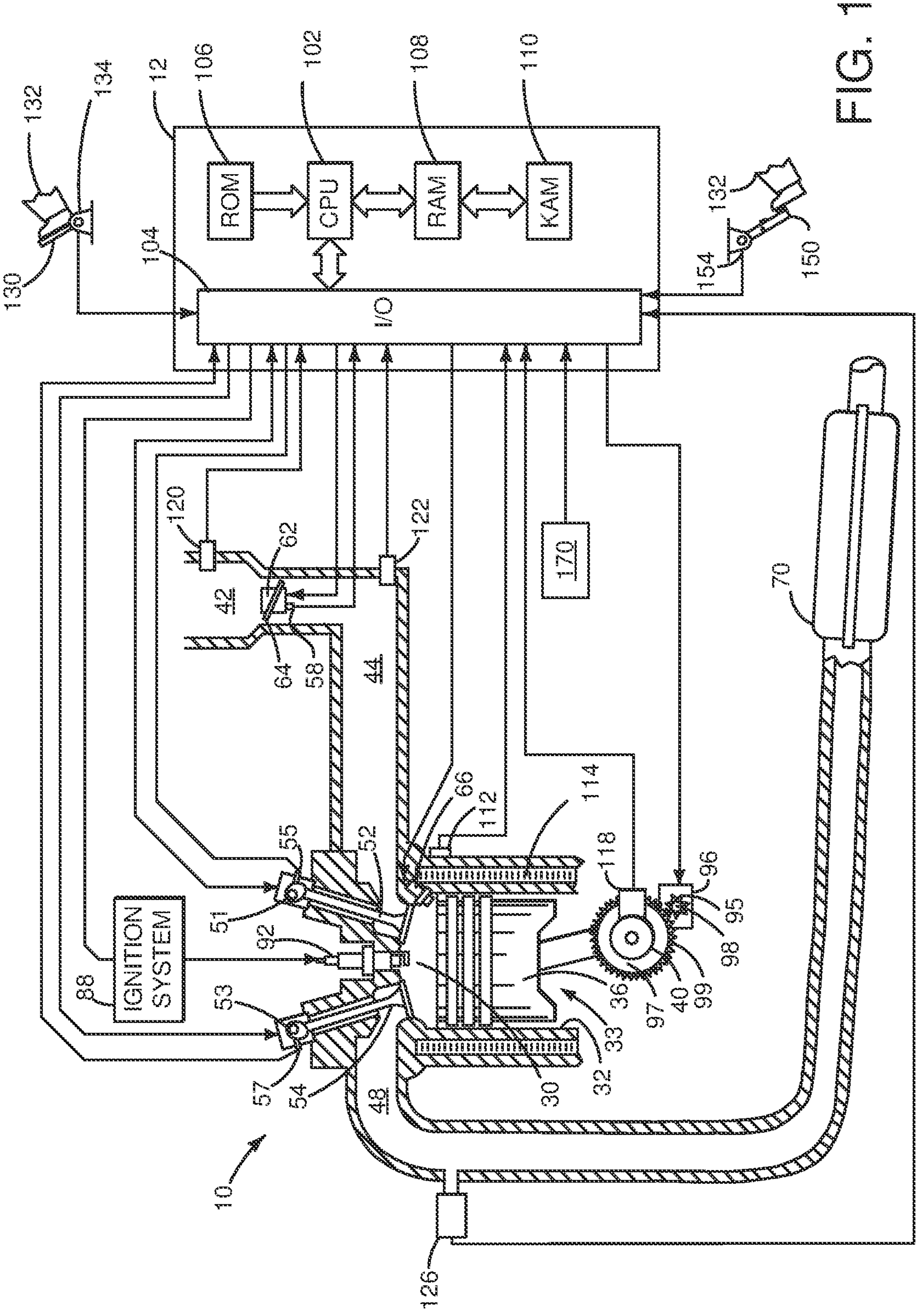
FIG. 1 is a schematic diagram of an engine.

Referring to FIG. 1, engine 10 is an internal combustion engine that comprises a plurality of cylinders, one cylinder 33 of which is shown in FIG. 1. Engine 10 is controlled by electronic engine controller 12. The controller receives signals from the various sensors of FIG. 1 and it employs the various actuators of FIG. 1 to adjust engine operation based on the received signals and instructions stored in memory of controller 12. For example, fuel injection timing, spark timing, and poppet valve operation may be adjusted responsive to engine position as determined from output of an engine position sensor.

Engine 10 includes combustion chamber 30, cylinder 33, and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 33, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a measurement of engine manifold absolute pressure (MAP) from pressure sensor 122 coupled to intake manifold 44; an engine position sensor from engine position sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may receive input from human/machine interface 170. In one example, human/machine interface 170 may be a touch screen display. In other examples, human/machine interface 170 may be a key board, pushbutton, or other known interface. Controller 12 may also display information and data to human/machine interface 170.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, is a block diagram of a vehicle 290 including a powertrain or driveline 200. The powertrain of FIG. 2 includes engine 10 shown in FIG. 1.

Engine 10 may be started with an engine starting system shown in FIG. 1, via belt driven integrated starter/generator (BISG) 280, or via a driveline integrated starter/generator (ISG) (not shown) also known as a motor/generator. Further, torque of engine 10 may be adjusted via torque actuator 204, such as a fuel injector, throttle, etc.

BISG 280 is mechanically coupled to engine 10 via belt 281 and pulley 282. BISG 280 may be coupled to crankshaft 40 or a camshaft (e.g., 51 or 53). BISG 280 may operate as a motor when supplied with electrical power via electric energy storage device 240, which may be referred to as a battery. BISG 280 may operate as a generator supplying electrical power to electric energy storage device 240.

It may be noted that this example shows a single controller. However, in other examples, the functions and operations performed via controller 12 may be distributed between a plurality of controllers.

Engine crankshaft may be coupled to torque converter 206, and torque converter 206 is mechanically coupled to automatic transmission 208 via transmission input shaft 207. Torque converter 206 may also include a torque converter clutch 209. Automatic transmission 208 includes gear clutches (e.g., gears 1-10) 210 and forward clutch 212. Automatic transmission 208 is a fixed step ratio transmission. The gear clutches 210 and the forward clutch 212 may be selectively engaged to change a ratio of an actual total number of turns of input shaft 207 to an actual total number of turns of wheels 218. Gear clutches 210 may be engaged or disengaged via adjusting fluid supplied to the clutches via shift control solenoid valves (not shown). Torque output from the automatic transmission 208 may also be relayed to wheels 218 to propel the vehicle via output shaft 215. Specifically, automatic transmission 208 may transfer an input driving torque at the input shaft 207 responsive to a vehicle traveling condition before transmitting an output driving torque to the wheels 216. Controller 12 may selectively activate a torque converter clutch 209, gear clutches 210, and forward clutch 212. Controller 12 may also selectively deactivate or disengages a torque converter clutch 209, gear clutches 210, and forward clutch 212.

In response to a request to increase a speed of vehicle 290, controller 12 may obtain a driver demand torque or power request from a driver demand pedal or other device. Controller 12 then allocates a fraction of the requested driver demand torque to the engine and the remaining fraction to the BISG 280. Controller commands engine 10 and BISG 280 to generate commanded torques. If the BISG torque plus the engine torque is less than a transmission input torque limit (e.g., a threshold value not to be exceeded), the torque is delivered to torque converter 206, which then relays at least a fraction of the requested torque to transmission input shaft 207. The torque converter clutch 209 may be locked and gears may be engaged via gear clutches 210 in response to shift schedules and torque converter clutch lockup schedules that may be based on transmission input shaft torque and vehicle speed. In some conditions when it may be desired to charge electric energy storage device 240, a charging torque (e.g., a negative ISG torque) may be requested while a non-zero driver demand torque is present. Controller 12 may request increased engine torque to overcome the charging torque to meet the driver demand torque.

In response to a request to reduce speed of vehicle 290 and provide regenerative braking, controller 12 may provide a negative desired wheel torque based on vehicle speed and brake pedal position. Controller 12 then allocates a fraction of the negative desired wheel torque to the BISG 280 and/or engine 10, and the remaining fraction to friction brakes (not shown). Further, controller 12 may shift gears 211 based on a unique shifting schedule to increase regeneration efficiency. BISG 280 may supply a negative torque to engine 10, but negative torque provided by BISG 280 may be limited. Further, negative torque of BISG 280 may be limited (e.g., constrained to less than a threshold negative threshold torque) based on operating conditions of electric energy storage device 240, by controller 12. Engine 10 may also provide a negative torque by ceasing fuel delivery to engine cylinders. Engine cylinders may be deactivated with intake and exhaust valves opening and closing during engine rotation or with intake and exhaust valves held closed over one or more engine cycles while the engine rotates. Any portion of desired negative wheel torque that may not be provided by engine 10 and/or BISG 280 because of transmission or BISG limits may be allocated to friction brakes (not shown) so that the desired wheel torque is provided by a combination of negative wheel torque from friction brakes (not shown), engine 10, and BISG 280.

Engine torque may be controlled by controller 12 adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may control also torque output and electrical energy production from BISG 280 by adjusting current flowing to and from field and/or armature windings of BISG 280 as is known in the art.

Controller 12 may receive transmission input shaft position via a position sensor (not shown) and convert transmission input shaft position into input shaft speed via differentiating a signal from the position sensor. Controller 12 may receive transmission output shaft torque from a torque sensor (not shown). Controller 12 may also receive addition transmission information from sensors 277, which may include but are not limited to pump output line pressure sensors, transmission hydraulic pressure sensors (e.g., gear clutch fluid pressure sensors), ISG temperature sensors, driver in driver seat detection switch, driver's door switch, heart beat sensors, BISG temperature sensors, and ambient temperature sensors.

In some examples, controller 12 may communicate with and exchange data with navigation system 235 (e.g., a second controller). Navigation system 235 may determine a position and speed of vehicle 290 via data received from global positioning satellites (not shown). Navigation system 235 may also receive input via voice commands or via human/machine interface to determine a vehicle destination. Navigation system 235 may select a travel route based on the vehicle's present position and the vehicle's destination. Navigation system 235 may determine the travel route based on maps that may be stored within navigation system 235. Maps stored in navigation system 235 may include locations of traffic signs, fueling stations, and other points of interest. In addition, navigation system 235 may predict when a vehicle speed increase is expected based on the vehicle's present position and mapping data (e.g., road grade, travel route elevation, stored traffic signal or sign locations, etc.). Navigation system 235 may inform controller 12 of upcoming or predicted times and/or travel route locations where an increase in vehicle speed is predicted.

Controller 12 may communicate with satellite 275 via transceiver 220. Alternatively, transceiver 220 may be a transmitter-receiver. Controller 12 may receive input (e.g., data including locations and/or times when vehicle speed is predicted to increase and/or decrease) from or broadcast vehicle data to satellite 275 via transceiver 220. Controller 12 may also communicate with network 270 (e.g., cellular, vehicle to vehicle, vehicle to infrastructure networks) via transceiver 225. Alternatively, transceiver 225 may be a transmitter-receiver. Controller 12 may broadcast vehicle data to and receive input from network 270 via transceiver 225. Network 270 and/or satellite 275 may communicate with cloud computer 289 (e.g., a remote server). Cloud computer (e.g., a second controller) may communicate times and/or locations where vehicle speed may be expected to increase or decrease based on the vehicle's present position, road grade, traffic information (e.g., traffic jams, accident locations, etc.), and prior human driver behavior to controller 12 via satellite 275 and network 270 via radio or microwave frequencies 288.

Thus, the system of FIGS. 1 and 2 provides for a system for operating a vehicle, comprising: a vehicle including an internal combustion engine and a brake pedal; and a controller including executable instructions stored in non-transitory memory that cause the controller to inhibit automatic stopping of the internal combustion engine in response to predicted conditions that indicate an operator change of mind during a look ahead window. In a first example, the system further comprises additional instructions to not inhibit automatic stopping of the internal combustion engine in response to the predicted conditions that indicate the operator change of mind during a look ahead window. In a second example that may include the first example, the system includes where the look ahead window is a future time period, and where the look ahead window begins at a present time, or where the look ahead window begins at a time or vehicle location when a vehicle brake is applied. In a third example that may include one or more of the first and second examples, the system includes where the look ahead window is a distance in a travel path of the vehicle and further comprises adjusting the distance in response to one or more of a rate of vehicle speed reduction, a location of a traffic sign or signal, or a location of a road profile and/or attribute change. In a fourth example that may include one or more of the first through third examples, the system further comprises additional instructions to predict conditions that indicate the operator change of mind during the look ahead window. In a fifth example that may include one or more of the first through fourth examples, the system includes where the predicted conditions include an increase of vehicle speed. In a sixth example that may include one or more of the first through fifth examples, the system further comprises additional instructions to receive the predicted conditions that indicate the operator change of mind during the look ahead window from a second controller.

Figure 4:
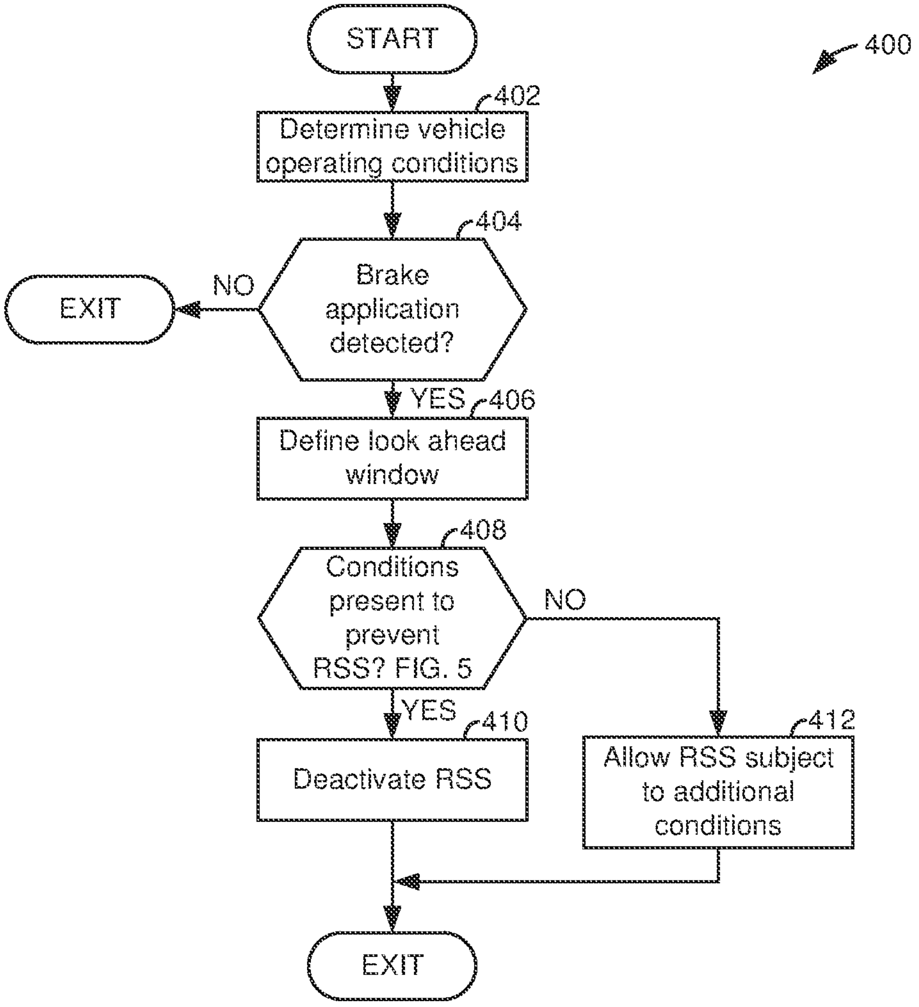
FIGS. 4 and 5 show an example flowchart of a method for operating an engine.
Figure 5:
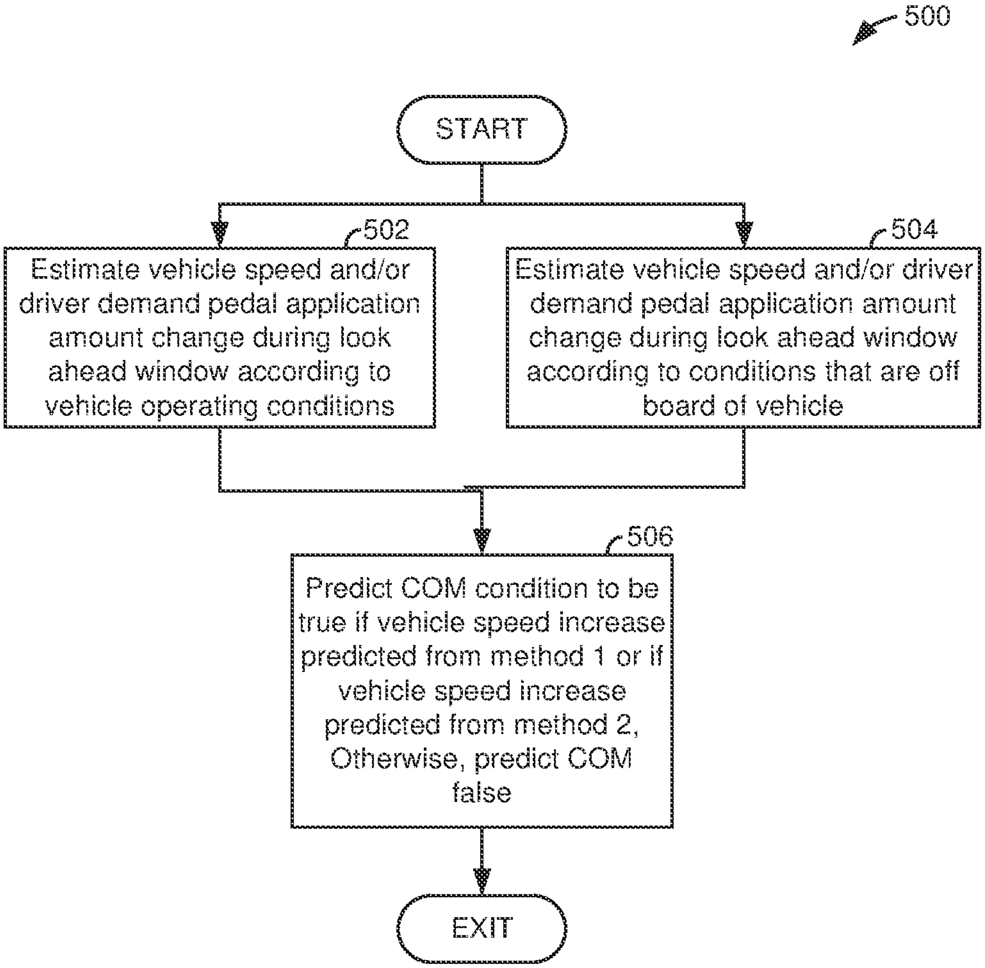

Referring now to FIG. 3, an engine operating sequence according to the method of FIGS. 4 and 5 is shown. The sequence of FIG. 3 may be performed via the system of FIGS. 1 and 2. The vertical lines at t0-t7 represent times of interest during the sequence.

The first plot from the top of FIG. 3 is a plot of brake pedal state versus time. The vertical axis represents the brake pedal state and the brake pedal is applied when trace 302 is at a higher level near the vertical axis arrow. The brake pedal is not applied when trace 302 is at a lower level near the horizontal axis. The horizontal axis represents time and the amount of time increases from the left side of the plot to the right side of the plot. Trace 302 represents the brake pedal state.

The second plot from the top of FIG. 3 is a plot of a look ahead window duration versus time. In one example, the look ahead window duration may be determined when a brake pedal is initially pressed. The look ahead window duration may be reset when the brake pedal is released and a new look ahead window duration may be determined the next time the brake pedal is initially applied. The duration of the look ahead window may vary as mentioned in the description of FIG. 4. The duration of the look ahead window may be an amount of time as shown in FIG. 3, or alternatively, it may be a distance traveled by a vehicle. The vertical axis represents when a look ahead window duration has been determined, and a look ahead window duration has been determined when trace 304 is at a higher level near the vertical axis arrow. A look ahead duration has not been determined when trace 304 is at a lower level near the horizontal axis. The horizontal axis represents time and the amount of time increases from the left side of the plot to the right side of the plot. Trace 304 represents the look ahead duration.

The third plot from the top of FIG. 3 is a plot of a vehicle speed estimate according to a first method as discussed with regard to FIG. 5. The vertical axis represents a vehicle speed estimate according to a first method. The horizontal axis represents time and the amount of time increases from the left side of the plot to the right side of the plot. Trace 306 represents the vehicle speed estimate according to a first method.

The fourth plot from the top of FIG. 3 is a plot of a vehicle speed estimate according to a second method as discussed with regard to FIG. 5. The vertical axis represents a vehicle speed estimate according to a second method. The horizontal axis represents time and the amount of time increases from the left side of the plot to the right side of the plot. Trace 308 represents the vehicle speed estimate according to a second method.

The fifth plot from the top of FIG. 3 is a plot of a state of an estimated or inferred operator change of mind (COM) state versus time. The vertical axis represents the estimated or inferred operator change of mind state and the change of mind conditions are estimated to be present when trace 310 is at a higher level near the vertical axis arrow. The operator change of mind conditions are not estimated to be present or inferred when trace 310 is at a lower level near the horizontal axis. The horizontal axis represents time and the amount of time increases from the left side of the plot to the right side of the plot. Trace 310 represents the operator change of mind condition state.

An estimated or inferred operator change of mind may be indicated via an operator's actions. For example, if driver demand is low and vehicle speed is increasing or decreasing, there may be an opportunity to stop the engine to conserve fuel. However, if the driver releases a brake or increases the driver demand torque, it may be an indication that the driver does not intend to stop the vehicle. As such, the change from a low driver demand to a higher driver demand may be indicative of a change of mind by the driver. The estimated or inferred driver change of mind may be acted upon by the controller to adjust vehicle operation.

The sixth plot from the top of FIG. 3 is a plot of a state of rolling stop start (RSS) (a state of inhibiting engine rotation while a vehicle is moving) inhibiting versus time. The vertical axis represents the state of RSS inhibiting and RSS is inhibited when trace 312 is at a higher level near the vertical axis arrow. RSS is not inhibited when trace 312 is near the horizontal axis. The horizontal axis represents time and the amount of time increases from the left side of the plot to the right side of the plot. Trace 312 represents the RSS inhibit state.

The seventh plot from the top of FIG. 3 is a plot of a state of rolling stop start (RSS) versus time. The vertical axis represents the state of RSS and RSS is active when trace 314 is at a higher level near the vertical axis arrow. RSS is not active when trace 314 is near the horizontal axis. The horizontal axis represents time and the amount of time increases from the left side of the plot to the right side of the plot. Trace 314 represents the RSS state.

The eighth plot from the top of FIG. 3 is a plot of a state of an engine of the vehicle versus time. The vertical axis represents the state of the engine and the engine is active when trace 316 is at a higher level near the vertical axis arrow. The engine is not running (combusting fuel) is not active when trace 316 is near the horizontal axis. The horizontal axis represents time and the amount of time increases from the left side of the plot to the right side of the plot. Trace 316 represents the engine operating state.

At time t0, the engine is on and the brake pedal is not applied. The look ahead window is not determined and the first and second vehicle speed estimates are not determined since there presently is no look ahead window being determined. The change of mind state is not indicated and inhibiting of RSS is not active. RSS is not active.

At time t1, the engine continues running and the brake pedal is applied. The look ahead window duration is determined and first and second vehicle speed estimates for the time or distance of the look ahead window duration are determined in response to the brake pedal being applied. The first vehicle speed estimate during the look ahead window duration does not increase, but the second does increase during the look ahead window. Therefore, the COM is indicated and inhibiting of RSS is activated. Consequently, the engine and vehicle are prevented from entering RSS state. This may prevent driveline torque disturbances if the driver actually does call for a vehicle speed increase during the look ahead window period.

At time t2, the actual vehicle speed (not shown) reaches zero and the engine is automatically stopped. The vehicle is still operating within the look ahead window duration and the first and second vehicle speed estimates reflect the values determined at time t1 when the brake pedal was first applied. The COM state remains asserted and RSS inhibit remains in effect even though the engine is stopped shortly after vehicle speed reaches zero. In other words, the COM state and the RSS state may not affect the engine stop after vehicle speed reaches zero. However, in other examples, automatic engine stopping may be inhibited while the RSS inhibit is activated.

At time t3, the present time is equal to the end of the look ahead duration that was determined at time t1. The brake pedal remains applied and the engine remains stopped. The first and second vehicle speed estimates are not updated and RSS inhibit is active.

At time t4, the driver releases the brake pedal causing the engine to start and the RSS inhibit and COM states to be adjusted to off or not asserted. The look ahead window is deactivated and the actual vehicle speed (not shown) begins to increase shortly after time t4.

Between time t4 and time t5, the first and second vehicle speed estimates are not determined since the look ahead widow is not activated. The engine continues to run and RSS inhibit is not activated. RSS is not active and COM is not asserted.

At time t5, the brake pedal is applied for a second time during the sequence. This causes the look ahead window duration to be determined and first and second vehicle speeds during the duration of the look ahead window are determined. The actual vehicle speed is at a middle level (not shown). The first and second vehicle speed estimates during the look ahead window duration are both decreasing and they do not increase. Therefore, the COM state is not asserted and RSS is not inhibited.

Shortly after time t5, RSS is entered and the engine is stopped (e.g., no longer combusting fuel). The brake pedal continues to be applied and actual vehicle speed (not shown) is gradually reduced.

At time t6, the duration of the look ahead window ends and the brake pedal continues to be applied. The vehicle continues to move (not shown) and RSS remains activated so that the engine is stopped. COM and RSS inhibit are not asserted since the first and second vehicle speed estimates did not increase during the look ahead window. The first and second vehicle speed estimates are no longer determined since the look ahead window is not active.

It may be appreciated that the brake pedal may be released during the time that the look ahead window is present or activated. During such conditions, the controller may determine that driver change of mind conditions are present.

At time t7, the brake pedal is released and shortly thereafter the driver demand torque increases (not shown). The first and second vehicle speed estimates are not determined since the look ahead window is no longer activated. The RSS inhibit is not asserted and the engine is started in response to the release of the brake pedal. The vehicle exits RSS.

In this way, a look ahead window may be generated in response to application of a brake pedal. Additionally, vehicle speed estimates from two different sources may be generated and COM conditions may be inferred from the vehicle speed estimates. RSS may be inhibited in response to COM conditions being expected or predicted to happen during the time or distance of the look ahead window.

Referring now to FIGS. 4 and 5, a method for operating an engine is shown. The method of FIGS. 4 and 5 may be stored as executable instructions in controller 12 for the system of FIGS. 1 and 2. Further, the method of FIGS. 4 and 5 may provide the example sequence shown in FIG. 3. In addition, the methods of FIGS. 4 and 5 may work in cooperation with the system of FIGS. 1 and 2 to receive data and adjust actuators to control the system of FIGS. 1 and 2 in the physical or real world.

At 402, method 400 determines vehicle operating conditions. Vehicle operating conditions may be determined via the controller receiving input from the various sensors that are coupled to the controller. Vehicle operating conditions may include but are not limited to driver demand torque, vehicle speed, engine speed, engine load, transmission operating state, ambient temperature, ambient pressure, engine temperature, vehicle speed, battery SOC, and brake pedal position. Method 400 proceeds to 404.

At 404, method 400 judges if a vehicle brake pedal and/or vehicle brakes have been applied. In one example, method 400 may judge if the brake pedal has been applied based on a position of a brake pedal. If method 400 judges that the brake pedal has been applied, the answer is yes and method 400 proceeds to 406. Otherwise, the answer is no and method 400 proceeds to exit.

At 406, method 400 defines a look ahead window. In some examples, the look ahead window may be an amount of time in the future from the present time. In other examples, the look ahead window may be a distance that the vehicle travels from a present location of the vehicle. The duration of the look ahead window (e.g., a time or a vehicle distance) may be adjusted for vehicle operating conditions including but not limited to engine temperature, vehicle speed, a rate that vehicle speed declines, a location of a traffic sign or signal in a travel route of the vehicle, and/or a location of a road profile change (e.g., road grade increase or decrease, change in road surface conditions or attributes (e.g., from dry to icy), etc.) in a travel route of the vehicle. For example, a look ahead window duration may be 30 second for a first rate of vehicle speed reduction and 35 seconds for a second rate of vehicle speed reduction, where the first rate of vehicle speed reduction is greater than a second rate of vehicle speed reduction. In another example, the duration of a look ahead window may be increased according to a location of an upcoming traffic signal or sign along a vehicle travel route. In still another example, the duration of the look ahead window may be increased or decreased according to road surface information or data. For example, a look ahead widow may be increased from a first distance to a second distance in response to increasing vehicle speed and changing from an icy road surface to a dry road surface. The variable look ahead window may allow for an improved assessment of change of mind conditions during vehicle travel. Method 400 proceeds to 408.

At 408, method 400 judges whether or not conditions to prevent or inhibit automatic engine stopping while a vehicle is moving are expected to occur during the period of the defined look ahead window. In other words, method 400 may judge if one or more conditions that may be indicative of driver or operator change of mind conditions are predicted to occur during the duration of the look ahead window. If so, the answer is yes and method 400 may proceed to 410. Otherwise, the answer is no and method 400 proceeds to 412.

At 410, method 400 inhibits or deactivates automatic engine rolling stop/start (RSS) where the engine may be automatically stopped while a vehicle that includes the engine is moving. In one example, method 400 may set a value of a variable (e.g., bit, byte, word) in controller memory to a value that indicates automatic engine stopping (e.g., ceasing of combustion in the engine) is to be inhibited until the value of the variable is cleared. Thus, an engine that is running (e.g., rotating and combusting fuel) may continue to run so that driveline torque disturbances that may be related to reactivating an engine may be avoided. If method 400 takes this path, vehicle drivability may be improved during conditions when a vehicle driver would have or may be expected to have increased a driver torque demand or release a vehicle brake pedal during a duration of a look ahead window. Method 400 proceeds to exit.

At 412, method 400 permits automatic engine stopping (e.g., when the engine is stopped via the controller without receiving an engine stop command from a human operator) subject to additional conditions. For example, automatic engine stopping may be initiated in response to driver demand being less than a threshold driver demand and battery state of charge being greater than a threshold state of charge. If conditions are present to automatically stop the engine while the vehicle is moving, method 400 may stop an engine automatically via ceasing to flow fuel to the engine. Method 400 proceeds to exit.

In this way, automatic engine stopping while a vehicle is moving, which may be referred to as rolling stop/start, may be inhibited or permitted in response to conditions that may be indicative of an operator or driver change of mind and that may happen during a look ahead window duration. In particular, if conditions that may be indicative of operator change of mind are not predicted to occur during a look ahead window, automatic engine stopping while a vehicle is moving may be permitted. However, if conditions that may be indicative of operator change of mind are predicted to occur during a look ahead window, automatic engine stopping while a vehicle is moving may not be permitted.

Referring now to FIG. 5, method 500 may determine vehicle operating conditions that may be indicative of a change of mind by a vehicle's human driver or operator after a brake pedal is applied. In one example, the vehicle operating conditions that may be indicative of a change of mind of a vehicle operator may be an increase in vehicle speed. For example, an engine may be deactivated and stopped in response to a low driver demand torque, but if there vehicle's driver is predicted to request an increase in vehicle speed via demanding more torque or via reducing a braking torque while a vehicle is traveling downhill, then it may be determined that a driver (e.g., human driver) had a change in mind as to vehicle torque and speed. Of course, method 500 may infer or predict a driver change of mind according to other vehicle operating conditions such as a reduction of braking torque or increasing driver demand torque while vehicle brakes are being applied, or applying a driver demand pedal (e.g., a tip-in) to increase driver demand torque while a brake pedal is released and while the vehicle is approaching a hill. Two different vehicle speeds or driver demand pedal positions may be estimated according to method 500 at substantially a same time to predict whether or not conditions may be indicative of an operator change of mind that may authorize inhibiting automatic engine stopping while the vehicle is moving. The predicted vehicle speeds may not be determined or considered when the vehicle brake or vehicle brake pedal is not applied. Method 500 proceeds to 502 and 504 simultaneously to determine whether or not conditions indicative of an operator change of mind may occur during a period of a look ahead window.

At 502, method 500 estimates a vehicle's speed and/or driver demand pedal application amount during a look ahead window according to on board vehicle operating conditions. On board vehicle operating conditions may be conditions of the vehicle and/or data and parameters that are part of the vehicle (e.g., maps, sensors, etc.). In one example, method 500 may apply the present rate of reduction in vehicle speed while the brake pedal is applied and the vehicle's present travel route to estimate the vehicle's speed during the look ahead window. For example, if the vehicle's present travel route as determined on board the vehicle using the vehicle's navigation system includes a stop sign that is 600 meters ahead, vehicle speed is decreasing at 2 (kilometers/hr)/second from a speed of 60 kilometers/hr such that the vehicle may be estimated or predicted to stop in 30 seconds, and the look ahead window is 20 seconds, then vehicle speed during the look ahead window may decrease from a value of 60 kilometers/hr to a value of 20 kilometers/hr during the duration of the look ahead window, where the look ahead window begins at the time that the brake pedal is applied. During such conditions, method 500 may judge that vehicle speed is expected or predicted to continue decreasing during the look ahead window.

Method 500 may estimate the driver demand pedal application amount according to a prior vehicle driving history that includes a driver demand pedal application amount that has been stored in controller memory for the vehicle's present travel route. In still another example, method 500 may estimate the driver demand pedal application amount according to the vehicle's present travel route, road grade information from map data, and vehicle speed limits that may be included in the map data.

Method 500 may also estimate or predict what the vehicle's speed and/or driver demand pedal application amount is expected to be during the look ahead window based on the vehicle traveling a same route at an earlier time or driver aggressiveness or behavior. For example, if the driver of a vehicle typically slows down for a yield sign, but does not completely stop, method 500 may estimate the vehicle's speed in the future based on the vehicle's speed while the vehicle traveled on the travel route at a past time. Thus, if the vehicle's speed is typically reduced from 60 kilometers/hour to 10 kilometers/hour during a particular section of a travel route, method 500 may predict that the vehicle's speed will match or follow the vehicle's speed from prior trips while the vehicle is traveling the particular section of the travel route. Method 500 may also estimate or predict the vehicle's speed and/or driver demand pedal application amount is expected to be via output of a second controller. For example, machine learning may be applied in a cloud server to predict vehicle speed according to various inputs including but not limited to traffic information, road type, road grade, weather conditions, and driver behavior. Method 500 proceeds to 506 after estimating vehicle speed according to a first method, where the first method estimates what the vehicle's speed may be expected to be during the time or distance of the look ahead window. Vehicle driving history may be stored in the controller and/or in the vehicle's navigation system. Method 500 proceeds to 506.

It may be mentioned that method 500 may estimate or predict other conditions that may imply that driver change of mind conditions may occur during a look ahead window. For example, method 500 may predict driver demand pedal position or driver demand torque instead or along with vehicle speed to predict the presence or absence of driver change of mind conditions. For example, method 500 may predict driver demand pedal position will follow driver demand pedal position of a previous drive history.

At 504, method 500 estimates a vehicle's speed during a look ahead window according to conditions that are off board the vehicle that includes the engine. Off board conditions may include but is not limited to behavior of other surrounding vehicles, such as vehicles that are in front of the vehicle. Off board conditions may also include status of traffic lights, status of traffic signs, obstacles detected in a travel path that are not included in maps, etc. The off board conditions may be determined from vehicle to infrastructure communications systems, vehicle to vehicle communications systems, and/or sensors that detect objects that are external to the vehicle.

TABLE 1

| Vehicle operating condition | Conditions in look ahead window | Vehicle speed increase or COM prediction |
|---|---|---|
| Vehicle is headed to a stop sign | Stop sign | YES - for drivers that do not tend to come to a complete stop for the stop sign.<br>NO - for drivers that do come to complete stop |
| Vehicle approaching traffic light | Traffic light expected to change from green to red | NO |
| | Traffic light expected to stay green | YES |
| | Traffic light expected to change from red to green | YES |
| | Traffic light expected to stay red | NO |
| Leading vehicle's behavior | Approaching stopped vehicle | NO |
| Vehicle's sensors detecting off board conditions | Approaching vehicle that is beginning to move | YES |
| Vehicle receiving data from communications systems | Speed of leading vehicle is increasing | YES |
| | Speed if leading vehicle is decreasing | NO |

Table 1 above includes three columns and six rows. The table cell in the first column and first row lists the conditions for the first column as vehicle operating conditions. The table cell in the second column and first row lists the conditions for the second column as conditions that fall into the vehicle look ahead window. The table cell in the third column and first row lists the conditions for the third column as a vehicle speed increase that indicates a COM prediction.

The second row first column describes a condition of a vehicle approaching a stop sign and the stop sign falls within the look ahead window according to the cell of the second row second column. The third column indicates whether or not the conditions are expected to result in an indication of COM or an increase in vehicle speed during the look ahead window. The second row third column indicates that a COM or an increase in vehicle speed may be expected if the vehicle's driver has a history of not completely stopping the vehicle for the sign. However, the second row third column also indicates that a COM or increase in vehicle speed may not be expected if the vehicle's driver has a history of completely stopping for the sign. YES conditions in table 1 indicate that vehicle speed may be expected to increase during the time or distance of the look ahead window. NO conditions in table 1 indicate that vehicle speed may not expect to increase during the time or distance of the look ahead window. The remaining rows and columns of table 1 indicate where COM conditions may or may not be expected. Method 500 proceeds to 506.

At 506, method 500 may predict a change of mind (COM) condition will be present (YES) or true during a look ahead window if vehicle speed according to method 1 is expected to increase. Method 500 may also predict that COM conditions are or will be present (YES) or true in the look ahead window if vehicle speed according to method 2 is expected to increase. Otherwise, method 500 predicts that conditions for a COM are not present. Method 500 passes the result of 506 to method 400 and method 400 judges whether or not to inhibit RSS.

In this way, two different methods may be applied to determine if conditions indicative of an operator change of mind may be expected or predicted to occur during a time when a look ahead window is active. If either or both conditions are expected, then RSS may be inhibited.

Thus, the method of FIGS. 4 and 5 provides for a method for operating an engine, comprising: inhibiting automatic engine stopping via a controller according to a prediction that conditions indicative of an operator change of mind condition are expected within a look ahead window. The method includes where the look ahead window is a future period of time, and where the look ahead window begins at a present time, or where the look ahead window begins at a time or vehicle location when a vehicle brake is applied. The method further comprises adjusting the future period of time in response to one or more of a rate of vehicle speed reduction, a location of a traffic sign or signal, or a location of a road profile and/or attribute change. The method includes where the look ahead window is a distance between a present vehicle position and a future vehicle position. The method further comprises adjusting the distance between the present vehicle position and the future vehicle position in response to one or more of a rate of vehicle speed reduction, a location of a traffic sign or signal, or a location of a road profile and/or attribute change. The method includes where the conditions indicative of the operator change of mind condition include an increase of predicted vehicle speed. The method includes where the conditions indicative of the operator change of mind condition include an increase of driver demand pedal position. The method includes where the conditions indicative of the operator change of mind condition include at least partially releasing a brake pedal.

The method of FIGS. 4 and 5 also provides for a method for operating an engine, comprising: predicting a presence or absence of a change in a vehicle speed within a look ahead window via a controller; and inhibiting automatic engine stopping via a controller according to the prediction of the presence of the change in the vehicle speed. The method includes where the change in vehicle speed is an increase in the vehicle speed, or where the change of driver demand pedal position is an application of a driver demand pedal. The method includes where the prediction is based on data gathered internal to a vehicle that includes the engine and not data gathered external to the vehicle. The method includes where the prediction is based on data for conditions external to a vehicle that includes the engine. The method further comprises permitting automatic engine stopping via the controller according to the absence of the change in the vehicle speed within the look ahead window.

Referring now to FIG. 6A, a diagram illustrating a look ahead window and travel path is shown. Vehicle 290 may travel on road 610 which may be part of a longer travel path 605. The travel path 605 may include a plurality of roads that are between the present positon of the vehicle 601 and the vehicle's destination (not shown). Look ahead window 602 may represent a time or distance that may be traveled by vehicle 290. For example, look ahead window 602 may be a distance from the vehicle's present location 601 to a predetermined distance (e.g., 100 meters) 603 in the vehicle's path. The length or duration of look ahead window 602 may be adjusted according to a distance between vehicle 290 and traffic signal or sign 630 or a change in road profile and/or attributes 632.

On the other hand, look ahead window 602 may represent an amount of time that extends into the future, the time beginning when the vehicle's brake pedal is applied and ending a predetermined amount of time into the future. A time based look ahead window is illustrated in FIG. 6B. Plot 650 includes a vertical plot that represents the look ahead window state and the look ahead window is active when trace 655 is at a higher level that is near the vertical axis arrow. The horizontal axis represents time and time increases from the left side of the plot to the right side of the plot.

At time t10 the look ahead window is activated and vehicle speeds for determining change of mind conditions may be determined when the look ahead window is activated. At time t11, the look ahead window is deactivated. As such, if vehicle speed increases between time t10 and time t11, it may be determined that change of mind conditions may occur during the look ahead window so that RSS may be inhibited.

Referring now to FIG. 7, an example vehicle drive history 700 is shown. Drive history 700 may include a plurality of vehicle control parameter including but not limited to driver demand, brake torque, and vehicle speed. These parameters may be recorded to controller memory during a vehicle drive to build the drive history 700. The drive history may be useful to predict when a driver will increase driver demand torque while driving a particular road to increase vehicle speed.

In this example, the drive history 700 starts at time t20 and it includes applying vehicle brakes at time t21, releasing brakes at time t22 and increasing the driver demand torque, and applying vehicle brakes a second time at time t23. A drive history may be long or short in duration and a vehicle controller may store a plurality of vehicle drive histories.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:

detecting brake application;

defining a look ahead window, where the look ahead window is at least 20 seconds in duration, and where the look ahead window begins at a time or vehicle location when the brake pedal is applied;

inhibiting automatic engine stopping via a controller according to a prediction that conditions indicative of an operator change of mind condition are expected within the look ahead window, where conditions indicative of the operator change of mind comprise an increase of predicted vehicle speed, an increase of driver demand pedal position, at least partially releasing a brake pedal, and off board conditions.

2. The method of claim 1, where the look ahead window is a future period of time.

3. The method of claim 2, further comprising adjusting the future period of time in response to one or more of a rate of vehicle speed reduction, a location of a traffic sign or signal, or a location of a road profile and/or attribute change.

4. The method of claim 1, where the look ahead window is a distance between a present vehicle position and a future vehicle position, and where the off board conditions include at least one of behavior of other surrounding vehicles, status of traffic lights, status of traffic signs, or obstacles detected in a travel path that are not included in maps.

5. The method of claim 4, further comprising adjusting the distance between the present vehicle position and the future vehicle position in response to one or more of a rate of vehicle speed reduction, a location of a traffic sign or signal, or a location of a road profile and/or attribute change.

6. The method of claim 1, where the look ahead window is at least 30 seconds.

7. The method of claim 1, where the look ahead window is reset when the brake is released.

8. A system for operating a vehicle, comprising:

an internal combustion engine and a brake pedal; and a controller including executable instructions stored in non-transitory memory that cause the controller to: define a look ahead window, where the look ahead window is a future period of time, and where the look ahead window begins at a time or a vehicle location when a vehicle brake is applied; and inhibit automatic stopping of the internal combustion engine in response to predicted conditions that indicate an operator change of mind during the look ahead window, where conditions that indicate the operator change of mind comprise determining a first vehicle speed estimate and a second vehicle speed estimate during the look ahead window, and where the first vehicle speed estimate and the second vehicle speed estimate are different, and where the vehicle speed estimation is based on off board conditions.

9. The system of claim 8, further comprising additional instructions to not inhibit automatic stopping of the internal combustion engine in response to the predicted conditions that indicate the operator change of mind during the look ahead window.

10. The system of claim 8, where the off board conditions include at least one of behavior of other surrounding vehicles, status of traffic lights, status of traffic signs, or obstacles detected in a travel path that are not included in maps, and where the look ahead window is a distance in a travel path of the vehicle, and further comprising:

adjusting the distance in response to one or more of a rate of vehicle speed reduction, a location of a traffic sign or signal, or a location of a road profile and/or attribute change.

11. The system of claim 8, further comprising additional instructions to predict conditions that indicate the operator change of mind during the look ahead window.

12. The system of claim 8, further comprising additional instructions to receive predicted conditions that indicate the operator change of mind during the look ahead window from a second controller.

13. The system of claim 8, where the first vehicle speed estimate during a look ahead window duration does not increase; and where the second vehicle speed estimate during the look ahead duration increases.

14. A method for operating an engine, comprising:

defining a look ahead window;

predicting a presence or absence of a change in a vehicle speed within the look ahead window via a controller, where the look ahead window is a future period of time, and where the look ahead window begins at a time or vehicle location when a vehicle brake is applied;

where a predicted vehicle speed is generated by two different sources; and inhibiting automatic engine stopping via the controller according to the predicting the presence of the change in the vehicle speed, where the predicting is based on data for conditions external to a vehicle that includes the engine, and where the conditions external to the vehicle that includes the engine comprise status of traffic lights, status of traffic signs, obstacles detected in a travel path that are not included in maps, and behavior of other surrounding vehicles.

15. The method of claim 14, where the change in vehicle speed is an increase in the vehicle speed.

16. The method of claim 14, where the predicting is based on data gathered internal to the vehicle that includes the engine.

17. The method of claim 14, further comprising permitting automatic engine stopping via the controller according to the absence of the change in the vehicle speed within the look ahead window.

18. The method of claim 14, where the presence or absence of the change in the vehicle speed is predicted based on drive history.

* * * * *